Sept. 7, 1948.  E. M. SORENSEN  2,448,555
AUTOMATIC RADIO RANGE CONTROL FOR FLIGHT TRAINERS
Filed April 1, 1940  4 Sheets-Sheet 1

Sept. 7, 1948.  E. M. SORENSEN  2,448,555
AUTOMATIC RADIO RANGE CONTROL FOR FLIGHT TRAINERS
Filed April 1, 1940  4 Sheets-Sheet 2

Sept. 7, 1948.　　　　　E. M. SORENSEN　　　　　2,448,555
AUTOMATIC RADIO RANGE CONTROL FOR FLIGHT TRAINERS
Filed April 1, 1940　　　　　　　　　　　　　4 Sheets-Sheet 3

INVENTOR
EDWARD M. SORENSEN
BY Edgar H. Snodgrass
and Wade Koontz
ATTORNEYS

Sept. 7, 1948.       E. M. SORENSEN       2,448,555
AUTOMATIC RADIO RANGE CONTROL FOR FLIGHT TRAINERS
Filed April 1, 1940                    4 Sheets-Sheet 4

INVENTOR
EDWARD M. SORENSEN
ATTORNEYS

Patented Sept. 7, 1948

2,448,555

UNITED STATES PATENT OFFICE 2,448,555

AUTOMATIC RADIO RANGE CONTROL FOR FLIGHT TRAINERS

Edward M. Sorensen, Dayton, Ohio; Helen S. Sorensen, administratrix of said Edward M. Sorensen, deceased Application April 1, 1940, Serial No. 327,271

10 Claims. (Cl. 35—10)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an improved automatic radio range signalling system for use in conjunction with aviation ground trainers.

Aviation ground trainers for instructing students in the art of instrument flying are well known in the art. Such trainers generally comprise a dummy aeroplane, tiltably and rotatably mounted on a base and provided with a control system actuated by the student occupying the trainer, so that all normal maneuvers of an aeroplane in flight may be simulated, and for a more complete description of one type of ground trainer known as the "Link" trainer, reference may be had to United States Patents No. 1,825,462 and No. 2,099,857, granted to Edwin A. Link, Jr.

It is customary to employ an automatic course indicator, or recorder, with ground trainers, so that the recorder traces the simulated flight of the trainer on a suitable map, or record sheet. Such a recorder generally comprises a frame supported for movement on the record sheet surface by a plurality of rollers at least three in number. The rollers are interconnected by gearing, with a suitable "Selsyn" or other electric transmission receiver, which in turn is electrically connected to a corresponding "Selsyn," or other electrical motion transmission transmitter unit, rotated by the trainer as it changes its azimuth heading. The arrangement is such that the plane of rotation of each of the supporting rollers of the recorder is always parallel to the instant azimuth heading of the trainer. At least two of the supporting rollers are provided with small driving motors, rotatable about the steering axis of the rollers and driving the recorder over the record surface at a velocity representing to some predetermined scale the simulated velocity in flight of the trainer. One of the rollers, other than the power driven rollers, may be inked by a felt pad and serves as a marker means to trace the course of the simulated flight on the record sheet. When not inked the marker wheel serves as a course indicator. For a more detailed description of one suitable form of course recorder, reference may be had to United States Patent No. 2,179,663, granted to Edwin A. Link, Jr.

In order to simulate flight in an aviation ground trainer using the conventional radio range as a navigational aid, a signal system is provided, which can be manually controlled by an instructor to transmit the conventional A, N, or On course signal to headphones worn by the student, in accordance with the observed position of the course recorder marker wheel relative to a predetermined radio range laid out on the record sheet or map. The signal system employs an electrical audio tone generator having its output alternately keyed by a mechanically operated cam device to give the conventional A (dot dash) and N (dash dot) signals. A manually operated potentiometer, or other control, is employed to cause either one of the signals to predominate, or to transmit the signals in equal volume, to give the illusion of a continuous aural signal, representing the familiar radio range On course signal. A manually actuated signal volume control is provided to control the signal volume in proportion to the distance of the recorder from the radio range transmitter point on the record map and this control must be manually actuated by the instructor in coordination with the signal control means. One form of suitable signal system of the type above described is illustrated and described in United States Patent No. 2,119,083, granted to Edwin A. Link, Jr.

The manual actuation of the simulated radio range signalling system, as above described, introduces the factor of personal errors on the part of the instructor and this invention is primarily concerned with the provision of a simulated radio range signalling system which is fully automatic in its action and not dependent on the skill and dexterity of the instructor.

In accordance with the invention there is provided a plurality of radiant energy radiators so arranged that the center of radiant energy propagation is a point on the record table surface representing the radio range transmitting station. The radiators or antennas radiate two fields of electromagnetic waves at different frequencies and having directional patterns of the well known figure of eight type. A pair of tuned receiving antennas mounted on the course recorder, or indicator, receive the high frequency carrier waves and conduct the same to the signal system, where they are employed to modify the keyed signals generated by a tone generator of known type to transmit the A, N, or On course signals to headphones, worn by the trainer occupant, dependent on the location of the course recorder, relative to the radio range transmitter station point on the record table surface.

It is an object of the invention to provide in an aviation ground training system a ground trainer for simulating the flight of an aircraft, a course indicator directionally controlled by said trainer for indicating the simulated flight of said trainer, a signal generator, a signal receiver mounted in said trainer and connected to said generator, a radiant energy transmitter, a radiant energy pick-up means mounted on said course indicator for modifying the signals transmitted from said signal generator to said signal receiver in accordance with the position of said course indicator relative to the said radiant energy transmitter.

A further object of the invention is the provision in an aviation ground training apparatus of a course indicator directionally controlled by an aviation ground trainer, of a means for generating a plurality of directional radiant energy fields each of a different frequency, adjacent the surface of a reference table and propagated relative to a point thereon and a signal generator for transmitting directional signals of a character modified by the relative position between said course indicator and said point on the surface of said reference table.

A further object of the invention, is the provision of a signalling system for use in aviation ground trainers, employing a radiant energy directive antenna array having a form such, that the intensity of radiation at varying radial distances from said array, may be controlled in a predetermined manner.

Other objects of the invention will appear by reference to the specification and the appended drawings forming a part thereof and in which.

Figure 1:
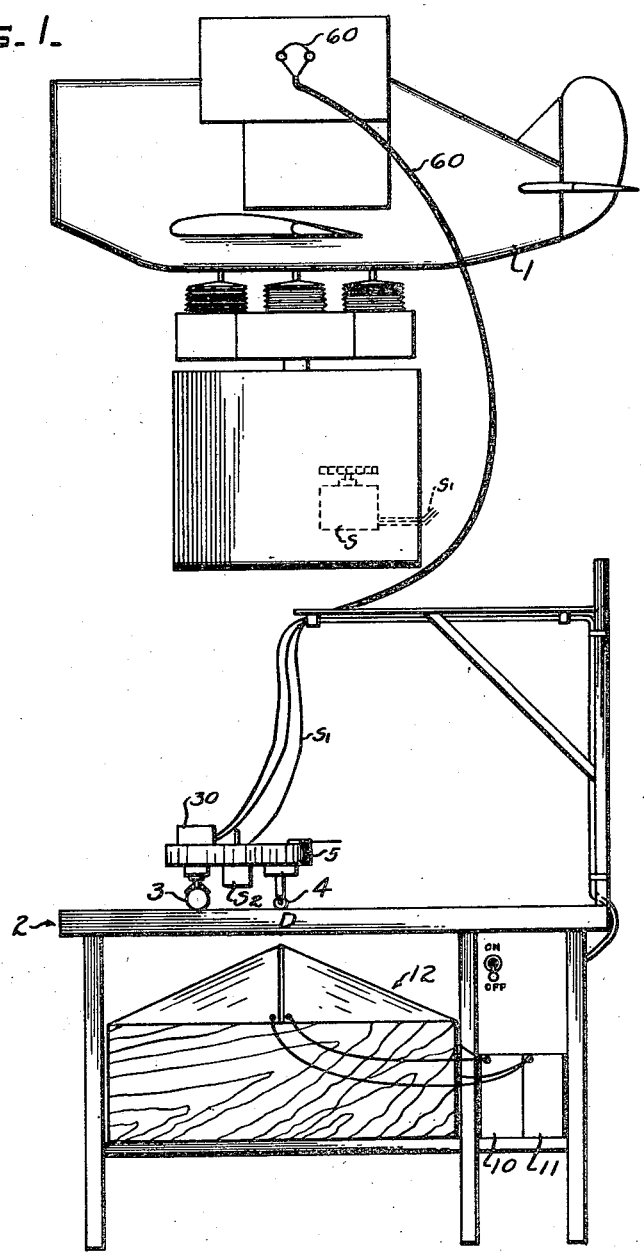
Fig. 1 is a side elevation showing the general assembly of the aviation ground trainer, the course indicator, or recorder and the radio range signalling system controlled thereby.

Referring to Fig. 1, the numeral 1 indicates an aviation ground trainer, tiltable and rotatable about the supporting base in the manner heretofore described. The "Selsyn," or other type electrical motion transmission transmitter S, is electrically connected by conductors $S_1$ to the "Selsyn" or other type electrical transmission receiver $S_2$, which directionally controls the power driven rollers 3 and marker roller 4 of the recorder, or course indicator 5, in the manner previously described. The course indicator marker wheel 4, when inked is adapted to trace the simulated flight course of the trainer 1, on a suitable map, or record sheet placed on the surface of the record table 2 and when not inked may serve as a position indicator.

A pair of radio frequency transmitters 10 and 11, respectively, are connected to a transmitting antenna array generally indicated by the reference numeral 12, mounted beneath the top of the record table 2. The antenna array 12, may be conical in form and the apex of the cone is placed directly beneath the point D, which is to represent the assumed radio range station point, on the reference surface of table 2. The antenna array 12, cooperates with a modulating receiving antenna system generally indicated by the reference numeral 30, mounted on the course indicator 5 and movable therewith. The modulator assembly 30, controls the signal generated by the signal generating system generally indicated by the reference numeral 40, to transmit a signal indicative of the position of the course indicator 5, relative to an assumed radio range at point D, on the record table surface, to headphones 60 in the cockpit of trainer 1.

The respective units of the automatic radio range signalling system will now be described.

*The radio frequency generator and antenna system*

Figure 2:
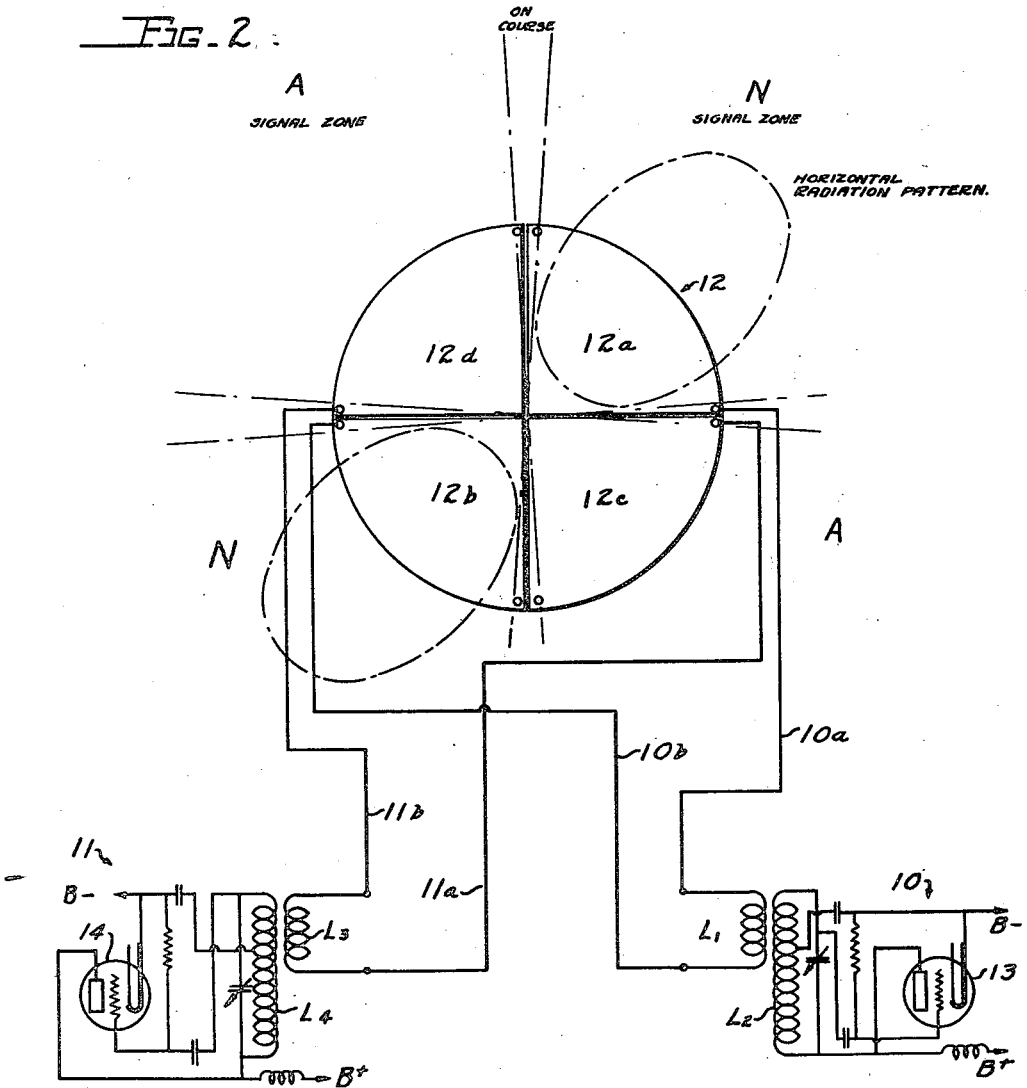
Fig. 2 is a schematic diagram of the radiant energy transmitters and antenna array.

As seen in Fig. 2, the radiant energy radiators, or antenna system 12, comprises a cone, or pyramid divided into four quadrants 12a, 12b, 12c and 12d respectively, which are insulated from each other and the diagonally opposite quadrants 12a and 12b, are respectively connected, to the respective output leads 10a and 10b, of the inductance coil $L_1$ energized by the radio frequency oscillator 10, having an oscillation frequency $F_1$.

The oscillator 10 employes a vacuum tube 13, of the familiar triode type using a cathode heater which is supplied from a suitable alternating, or direct current source (not shown). The cathode and plate are respectively connected to the negative and positive terminals B— and B+ respectively, of a suitable source of direct current (not shown). The plate, grid and cathode of the tube 13, are arranged with suitable condensers and a tank inductance $L_2$ in a familiar Hartley oscillator circuit, which is tuned to a predetermined oscillation frequency $F_1$. The oscillator output of the tank coil $L_2$, is inductively fed to coil $L_1$, which feeds the directive antenna elements 12a and 12b, which radiate high frequency electromagnetic waves in a figure of eight pattern as indicated in Fig. 2.

The oscillator 11, employs a vacuum tube 14 and an oscillator circuit, identical with that above described, with reference to oscillator 10 and the tank inductance $L_4$, feeds the oscillator output to the antenna inductance $L_3$, which in turn is connected to antenna elements 12c and 12d by leads 11a and 11b. The oscillator 11, is tuned for a frequency $F_2$, which differs from the frequency $F_1$, of oscillator 10. The antenna elements 12c and 12d, have directive radiating characteristics similar in all respect to those above described, with reference to antenna elements 12a and 12b. It is obvious, that a receiving antenna element placed in any one of the radiation quadrants from antenna elements 12a and 12b, will pick up a signal of maximum strength of frequency $F_1$ and when placed in one of the radiation quadrants from antenna elements 12c, or 12d, the maximum strength signal will be of frequency $F_2$. The radiant energy field radiated by the antenna array, will be in the form of quadrants having different frequencies on the surface of table 2 and the radiation center will be at point D, the assumed radio range station point on the reference surface.

*The recorder antenna unit*

Figure 3:
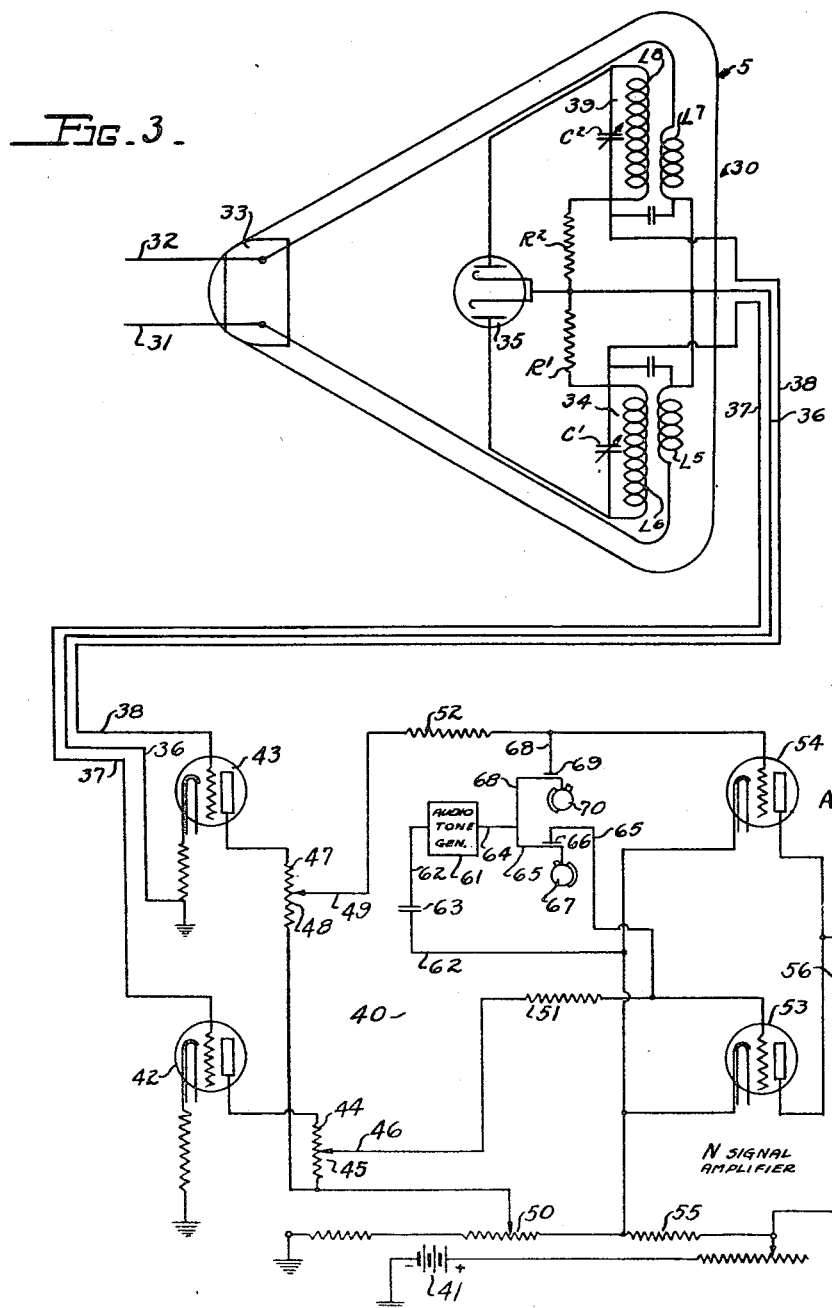
Fig. 3 is a schematic diagram illustrating the signal generator and the signal modifying circuit carried by the course indicator and operated in accordance with the position thereof.

As seen in Fig. 3, the pick-up antenna unit 30, mounted on the course indicator 5, comprises a pair of small antenna rods 31 and 32, horizontally mounted on an insulating block 33, mounted on the frame of the course indicator 5. If the course indicator is to be used as a recorder, a position of the block 33, may be determined by trial, which will bring the mean point of reception in the plane of the steering axis of marker wheel 4. The antenna 31 is connected to an antenna inductance L5, inductively coupled to a tuned resonant circuit 34, comprising the inductance L6 and condenser C1, which enables the circuit 34, to be tuned to frequency F1, of the transmitter 10. The circuit 34, is connected to one of the plates of a twin diode vacuum tube 35, in series with the load resistor R1. A conductor 36, supplies the cathodes with a suitable negative bias from a battery source hereinafter noted. The cathodes preferably are of the indirect heater type, the cathode heaters not being shown. The plate and cathode units serve as alternating current rectifiers or detectors. The antenna rod 32, antenna inductance L7, tuned circuit 39 comprising condenser C2 and inductance L8, load resistor R2 and the cathode and remaining plate of the tube 35, are similarly arranged in a circuit identical to that above described, with reference to antenna rod 31. The conductors 37 and 38, form the output leads from each rectifier circuit. The resonant circuit 39, is tuned to be responsive to the frequency F2, of the transmitter 11.

The operation of the rectifier is as follows: the antenna 31, picks up the electromagnetic radiation from antenna 12, of frequency F1, generating a radio frequency current in inductance L5, which by transformer action appears in the resonant circuit 34. Since the radio frequency current can flow only from the plate to the cathode, a pulsating direct current voltage of negative sign, will be fed to output lead 37, the voltage being proportional to the strength of the radio frequency field at the point where antenna 31 happens to be positioned relative to the apex of antenna array 12. A similar negative pulsating direct current voltage will appear in the output lead 38, due to reception of radio frequency radiations of frequency F2, the direct current voltage in lead 38, similarly being dependent on the position of antenna 32 relative to the field of frequency F2. The pulsating direct current produced by the rectifiers may be considered as steady current.

*The Signal Generator Control System*

The signal generator and control system is indicated by numeral 40, in Fig. 3. The output leads 37 and 38, of the rectifier unit 30, are respectively connected to the grids of a pair of vacuum tubes 42 and 43, of the indirectly heated cathode, triode type, the cathodes of which are grounded and at the negative potential of the power supply battery 41. The lead 36, is similarly grounded. The plates of the tubes 42 and 43, are each connected in series with the resistance windings 44, of a potentiometer 45 and 47 of potentiometer 48 respectively which are in turn connected in parallel with the positive high voltage output of battery 41, through the variable resistance potentiometer 50 by which the potential across potentiometer resistances 44 and 47 may be adjusted. The potentiometer arm 46, of potentiometer 45, is connected through resistor 51, to the grid of an amplifier tube 53. The potentiometer arm 49, is similarly connected through a resistor 52, to the grid of an amplifier tube 54, similar to the tube 53. The cathodes of the tubes 53 and 54, are connected in parallel through resistor 55, with the positive high voltage terminal of battery 41. The plates of tubes 53 and 54, are connected in parallel to one terminal of the primary winding 56, of an audio coupling transformer 57, the other terminal of the primary winding connects to the positive high voltage terminal of the battery 41. The secondary winding 58, of transformer 57, connects to the headphone leads 60.

An audio tone generator 61, of well known construction has one lead 62, connected to the cathodes of tubes 53 and 54, through a blocking condenser 63, which isolates the high voltage of battery 41, from the tone generator. The output lead 64, of the audio tone generator 61, is connected by means of a branch 65 and cam actuated switch 66, to the grid of tube 53 and the output lead 64, is connected by means of a branch 68 and cam actuated switch 69, to the grid of tube 54. The switch 66, is actuated by a cam 67, having long and short raised portions, which close switch 66, for time intervals corresponding to the dash dot, or N signal in Morse code, when the cam 67 is rotated at a constant speed in a clockwise direction, by mechanism not shown. The cam 70, similarly actuates the switch 69, to form the dot dash, or A signal, when rotated clockwise by the same means, that actuates cam 67. It is seen that, when switch 66 is closed, the audio tone generated by unit 61, can be impressed on the grid of tube 53 and similarly, when switch 69 is closed, the audio tone will be impressed on the grid of tube 54. The audio tone generator and keying device are well known in the art and if desired additional cams known in the art may be used to key the audio tone generator output, to give station identification signals.

The operation is as follows: the rectified, or detected radiation, picked up by antenna rod 31. is impressed on the grid of tube 42 and being of negative sign, causes a reduction in the current flowing between the plate and cathode of tube 42. The grid of tube 53, is at a negative potential with respect to plate of tube 53, such that, the tube is normally operating in the cut off condition. The drop in current in the plate cathode circuit of tube 42, is in proportion to the increase of negative potential on its grid, which causes a decrease in the potential drop across resistance 44, of the potentiometer 45, which in turn causes a decreased negative bias on the grid of tube 53, allowing the audio frequency N signal to be passed in an amplified condition into the primary winding of transformer 57, since the cathode of tube 53 is negative with respect to the plate and by transformer action, transmitted to secondary winding 58 and to the headphones 60, mounted in the trainer cockpit.

In a similar manner, a radiant energy wave of frequency F2, will be transmitted by the antenna 32, to the rectifier tube 35, tube 43 and tube 54, to permit the A signal generated by the tone generator 61, to be amplified by tube 54 and transmitted to headphones 60.

Figure 4:
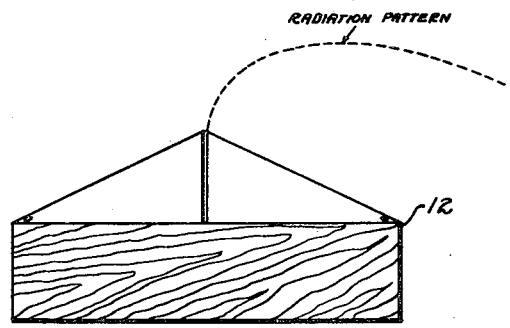
Fig. 4 is a side elevation of one form of antenna array, for use in accordance with the invention.
Figure 5:
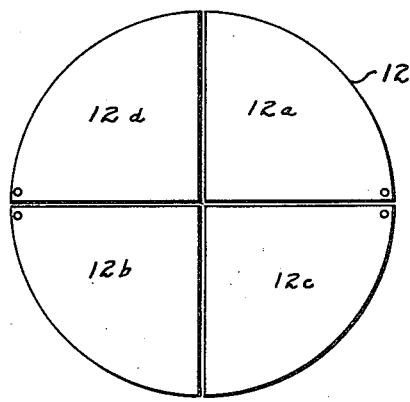
Fig. 5 is a top plan view of the device illustrated in Fig. 4.

Figs. 4 and 5, illustrate one form of radiating antenna array 12, for use with the oscillators 10 and 11, of the device illustrated in Fig. 2, which will give an elliptical radiation pattern in the vertical plane above the surface of table 2 and the diameter of the cone of silence may be adjusted by altering the distance between the apex of the cone of the antenna array and the table surface. The antenna is formed of metal segments secured to a wood, or other insulating material base, so that each of the segments 12a, 12b, etc., are insulated from each other and respectively connected to a corresponding oscillator output lead.

Figure 6:
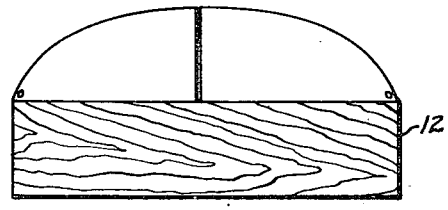
Fig. 6 is a side elevation of a modified form of antenna array, from that illustrated in Figs. 4 and 5.
Figure 7:
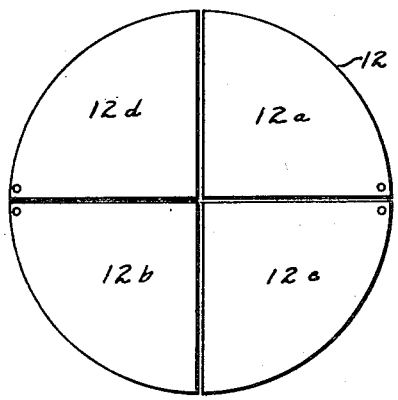
Fig. 7 is a top plan view of the device illustrated in Fig. 6.

Figs. 6 and 7, illustrate the antenna array 12, formed of hemispherical segments, or the curvature may be parabolic, so that the vertical radiation pattern may be altered, thus altering the relation between field intensity at any point on the table surface 2, relative to the radial distance from the point D.

*Operation of the complete system*

With the trainer and recorder in operation and the recorder in some position relative to point D, as seen in Fig. 1, the student in the trainer then starts the assumed flight and the recorder moves over the surface of table 2 in a directionally controlled movement, at a velocity proportional to the assumed velocity in flight of the trainer. With the oscillators 10 and 11 in operation and the recorder being assumed to be located, in, for example, the upper right hand radiation quadrant, indicated as the "N" signal zone in Fig. 2, the antenna pick-up 31 and 32, on the recorder 5, will be in a radiant energy field predominantly of frequency $F_1$ and antenna 31 and its tuned circuit, will cause a negative D. C. voltage proportional to the field strength at that location, to be impressed on the grid of tube 42, causing an N signal to be heard in the headphones 60, of an amplified intensity, also proportional to the field strength of the radiation picked up by the antenna rod 31. The antenna rod 32, and its resonant circuit 39, being responsive to the frequency $F_2$, will have a current generated therein, of a much smaller magnitude, so that the A signal output of amplifier tube 54, will cause a weak A signal in the headphones 60 and the N signal will predominate, the A signal being heard in the background. The N signal will increase to a maximum, when the recorder approaches the bisector of the N signal zone, at which point, the A signal will be substantially suppressed. A similar condition will prevail, if the recorder 5, happens to be located in one of the A signal zones, at which time, the conditions will be reversed and the A signal will be predominant. If the recorder 5, happens to be located on one of the On course signal zones indicated in Fig. 2, both the A and N signals, will be heard in the headphones 60 consecutively, with substantially the same intensity, which gives the impression of a continuous dash signal, representing the familiar radio range On course signal. Whatever the location of the recorder, if it moves toward the transmitting station point D, on the record table surface 2, the signal volume will increase, due to the increased field strength, as the center of radiation is approached and conversely the signal volume will decrease, as the recorder moves away from point D.

In order to automatically interrupt the signals in the cone of silence zone, a metal disc may be placed in the surface of table 2 at the station point D, of a desired diameter to represent the cone of silence diameter at a particular assumed altitude and one of the headphone leads may be connected to the disc, with the other headphone lead connected to the recorder frame, through a suitable conductor and resistance, so that when the metal marker wheel 4, contacts the disc the headphones 60, will be short circuited and no signal will be heard until the contact is broken. Such metal contacts may be used in conjunction with the marker wheel, to energize marker beacon signals mounted in the trainer cockpit, where the radio range signal system illustrated, is to be used as a runway localizer beam, to simulate blind instrument landings in the ground trainer. The above described cone of silence simulating means, or the marker beacon actuating means, has not been illustrated in the drawings, for purposes of simplicity.

I have thus disclosed a simple and effective system, for automatically transmitting radio range signals to an aviation ground trainer, in accordance with the position of the ground trainer course indicator, or recorder, relative to an assumed radio range, set up, relative to a point on the record map table. Well known means may be used to phase the directive antennas, to radiate electromagnetic waves having horizontal patterns, making angles of other than ninety degrees, with respect to each other, in order to simulate radio ranges, having signal zones of unequal angles.

Where it is desired to imitate connected radio ranges, a second antenna array with associated oscillators, may be located to radiate electromagnetic fieds of a different frequency, then employed by the first antenna array and the tuned circuits connected to the receiving antennas 31 and 32, with the associated rectifier tube 35, may be mounted in the trainer cockpit in a position to be manually tuned by the student, the pick-up antennas being connected to the tuned circuits by non-inductive antenna leads.

While a simple automatic radio range signalling system for aviation ground trainers has been illustrated and described, it will be apparent that other equivalent devices may be constructed falling within the scope of the invention as defined by the appended claims.

I claim:

1. In combination, a reference surface, a course indicator movable relative to said reference surface and adapted to indicate the simulated course of an aircraft flight, a plurality of electric oscillators, a directive antenna connected to each of said oscillators for radiating a high frequency electromagnetic field in definite zones over said reference surface, said fields being of different frequency, a pair of pick-up antennas mounted on said course indicator, a resonant circuit connected to each of said pick-up means and each responsive to the frequency of a different one of said fields, a signal generator for generating a plurality of positional signals of a different character and a plurality of control means each connected to one of said resonant circuits and to said signal generator and responsive to electromotive force generated in its respective resonant circuit for causing said signal generator to successively generate a signal of a character and volume dependent upon the electromotive force generated in each resonant circuit.

2. The structure as claimed in claim 1, in which there is provided a signal receiver connected to said signal generator for receiving the successive signals of different types generated by said signal generator.

3. The structure as claimed in claim 1, in which said signal generator includes an audio tone generator, a plurality of signal circuits connected to said audio tone generator, means for causing said signal generator to successively generate a signal of a different character in each of said circuits, a vacuum tube amplifier in each circuit connected to a respective one of said control means to be controlled thereby whereby the volume of the signal generated in each respective amplifier tube may vary from zero to a maximum value dependent on the effect of its said respective control means.

4. The structure as claimed in claim 1, in which the said signal generator includes an audio tone generator, a plurality of circuits connected to said tone generator, a keying means for generating a particular positional signal in each respective circuit in a predetermined sequence, a receiver and a connection between each of said circuits and said receiver.

5. An automatic radio range signalling system for aviation ground trainers comprising, a reference surface, a course indicator movable on said surface in a manner equivalent to the assumed flight course of an aircraft, means for establishing a plurality of electromagnetic fields each having a frequency equivalent to one of two predetermined frequencies and each field extending over a zone of said reference surface and radiating from a common point thereon, a pair of antenna pick-up devices mounted on said course indicator and each including a tuned circuit responsive to a different one of said predetermined frequencies, a vacuum tube control device coupled to each tuned circuit and yielding a control electromotive force proportional to the electromotive force developed by said tuned circuit, a power amplifier vacuum tube connected to each vacuum tube control device to be controlled thereby, a signal generator connected to both power amplifier tubes and operative to impress a predetermined positional signal thereon of a magnitude dependent on the associated control device and a signal receiver connected to each of said power amplifier tubes for receiving a respective signal therefrom of a volume dependent on the position of said course indicator relative to each of a pair of associated electromagnetic fields and upon the radial distance of said course indicator from said point on said reference surface.

6. The structure as claimed in claim 5, in which the means for establishing said electromagnetic fields comprise a plurality of radio frequency oscillators and a directive radiating antenna connected to each of said oscillators.

7. The structure as claimed in claim 5, in which the means for establishing said electromagnetic fields comprise, a plurality of radio frequency oscillators, and a directive radiating antenna connected to each of said oscillators, said directive antennas positioned so as to directively radiate said electromagnetic fields over said reference surface, from said point on said reference surface.

8. The structure as claimed in claim 5, in which the means for establishing said electromagnetic fields comprise, a plurality of radio frequency oscillators and a directive radiating antenna connected to each oscillator shaped in a manner to give a desired field intensity at different radial distances from the said point on said reference surface.

9. In apparatus of the type described, a pair of pick-up antennas movable relative to at least two fields of electromagnetic waves of different frequencies, a pair of tuned circuits each of said circuits being connected to a respective one of said pick-up antennas and responsive to one of said wave frequencies, a pair of direct coupled vacuum tube amplifiers each amplifier being connected to a respective one of said tuned circuits and responsive to electromotive force developed therein, a signal generator for alternately generating a predetermined signal in each of said amplifiers and signal receiving means connected to each of said amplifiers for receiving the signal amplified thereby with a volume determined by the electromotive force developed in the associated detector circuit.

10. In combination, a reference surface, a course indicator movable relative to said reference surface and adapted to indicate the simulated course of an aircraft flight, a plurality of electric oscillators, a directive antenna connected to each of said oscillators for radiating a high-frequency electromagnetic field in definite zones over said reference surface, said fields being of different frequency, antenna pickup means mounted on said course indicator, a pair of resonant circuits respectively coupled to said pickup means and each responsive to the frequency of a different one of said fields, a signal generator for generating a plurality of positional signals of a different character and a plurality of control means each connected to one of said resonant circuits and to said signal generator and responsive to electromotive force generated in its respective resonant circuit for causing said signal generator to generate a signal of a character and volume dependent upon the electromotive force generated in each resonant circuit.

EDWARD M. SORENSEN.

REFERENCES CITED

The following references are of record in the file of this patent:

UNITED STATES PATENTS

| Number | Name | Date |
| --- | --- | --- |
| 1,825,462 | Link, Jr. | Sept. 29, 1931 |
| 2,099,857 | Link, Jr. | Nov. 23, 1937 |
| 2,110,869 | Crane | Mar. 15, 1938 |
| 2,119,083 | Link, Jr. | May 31, 1938 |
| 2,164,412 | Koster | July 4, 1939 |
| 2,179,663 | Link, Jr. | Nov. 14, 1939 |

OTHER REFERENCES

Air Corps News Letter, vol. 21, No. 6, March 15, 1938, pages 7 and 8.